United States Patent
Ou et al.

(10) Patent No.: US 10,498,222 B2
(45) Date of Patent: Dec. 3, 2019

(54) POWER SUPPLY

(71) Applicant: DELTA ELECTRONICS, INC., Taoyuan (TW)

(72) Inventors: Cheng-Chieh Ou, Taoyuan (TW); Wei-Chieh Chao, Taoyuan (TW); Yu-Hsin Lee, Taoyuan (TW); Chi-You Ko, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/811,701

(22) Filed: Nov. 14, 2017

(65) Prior Publication Data
US 2019/0020264 A1     Jan. 17, 2019

(30) Foreign Application Priority Data

Jul. 17, 2017    (CN) .......................... 2017 1 0580615

(51) Int. Cl.
| | |
|---|---|
| *H02M 1/34* | (2007.01) |
| *H02M 3/335* | (2006.01) |
| *H02M 7/06* | (2006.01) |
| *H02M 1/32* | (2007.01) |
| *H02M 7/217* | (2006.01) |

(52) U.S. Cl.
CPC .............. *H02M 1/34* (2013.01); *H02M 1/32* (2013.01); *H02M 3/33507* (2013.01); *H02M 3/33576* (2013.01); *H02M 7/062* (2013.01); *H02M 7/2176* (2013.01); *H02M 2001/348* (2013.01)

(58) Field of Classification Search
CPC .... H02M 1/34; H02M 3/33576; H02M 7/062; H02M 2001/348
See application file for complete search history.

(56) References Cited

U.S. PATENT DOCUMENTS

| | | | |
|---|---|---|---|
| 2011/0164339 A1 | 7/2011 | Schmid et al. | |
| 2013/0100710 A1* | 4/2013 | Kang | H02H 7/125 363/21.12 |

FOREIGN PATENT DOCUMENTS

| | | |
|---|---|---|
| CN | 201717794 U | 1/2011 |
| CN | 201733087 U | 2/2011 |
| CN | 101997310 A | 3/2011 |
| TW | 200901593 A | 1/2009 |

OTHER PUBLICATIONS

The pertinent parts of US2011/0164339A1.

* cited by examiner

*Primary Examiner* — Jue Zhang
(74) *Attorney, Agent, or Firm* — CKC & Partners Co., LLC

(57) ABSTRACT

A power supply includes a rectifying circuit, a power converting circuit, and a snubber circuit. The rectifying circuit is configured to convert an ac input voltage to a first dc voltage. The power converting circuit is electrically coupled to the rectifying circuit at a node. The power converting circuit includes a switching element and is configured to convert the first dc voltage to a second dc voltage by selectively turning on or off the switching element. The snubber circuit is electrically coupled to the rectifying circuit and the power converting circuit at the node. When the first dc voltage is higher than a limiting level, the snubber circuit is configured to absorb the electricity power to prevent the voltage across the switching element from exceeding a safety upper limit.

12 Claims, 5 Drawing Sheets

POWER SUPPLY

RELATED APPLICATIONS

This application claims priority to China Application Serial Number 201710580615.X, filed Jul. 17, 2017, which is herein incorporated by reference.

BACKGROUND

Technical Field

The present disclosure relates to a power supply, and in particular, to the power supply with lightning and surge protection ability.

Description of Related Art

Recently, various electronic products and driving circuits apply switching power supply to provide power. When the lightning strikes to the system, the surge voltage with transient high level often occurs in the system, which impacts the function of the switching power supply.

Since the lightning and surge protection ability is closely related to the reliability of the electronic devices, an important area of research in the field involves ways in which to improve the lightning and surge protection ability to increase the stability of the power supply and provide the good power quality at the same time.

SUMMARY

One aspect of the present disclosure is a power supply. The power supply includes a rectifying circuit, a power converting circuit, and a snubber circuit. The rectifying circuit is configured to convert an ac input voltage to a first dc voltage. The power converting circuit is electrically coupled to the rectifying circuit at a node. The power converting circuit includes a switching element and is configured to convert the first dc voltage to a second dc voltage by selectively turning on or off the switching element. The snubber circuit is electrically coupled to the rectifying circuit and the power converting circuit at the node. On the condition that the first dc voltage is higher than a limiting level, the snubber circuit is configured to absorb the electricity power to prevent the voltage across the switching element from exceeding a safety upper limit.

Another aspect of the present disclosure is a power supply. The power supply includes a rectifying circuit, a power converting circuit, a transient voltage suppressor, a first diode, a capacitor unit and a resistor unit. The rectifying circuit is configured to convert an ac input voltage to a first dc voltage. The power converting circuit is electrically coupled to the rectifying circuit at a node and configured to convert the first dc voltage to a second dc voltage. A cathode of the transient voltage suppressor is electrically coupled to the node. An anode of the first diode is electrically coupled to an anode of the transient voltage suppressor. The capacitor unit is electrically coupled between a cathode of the first diode and a ground terminal. The resistor unit is electrically coupled to the capacitor unit in parallel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
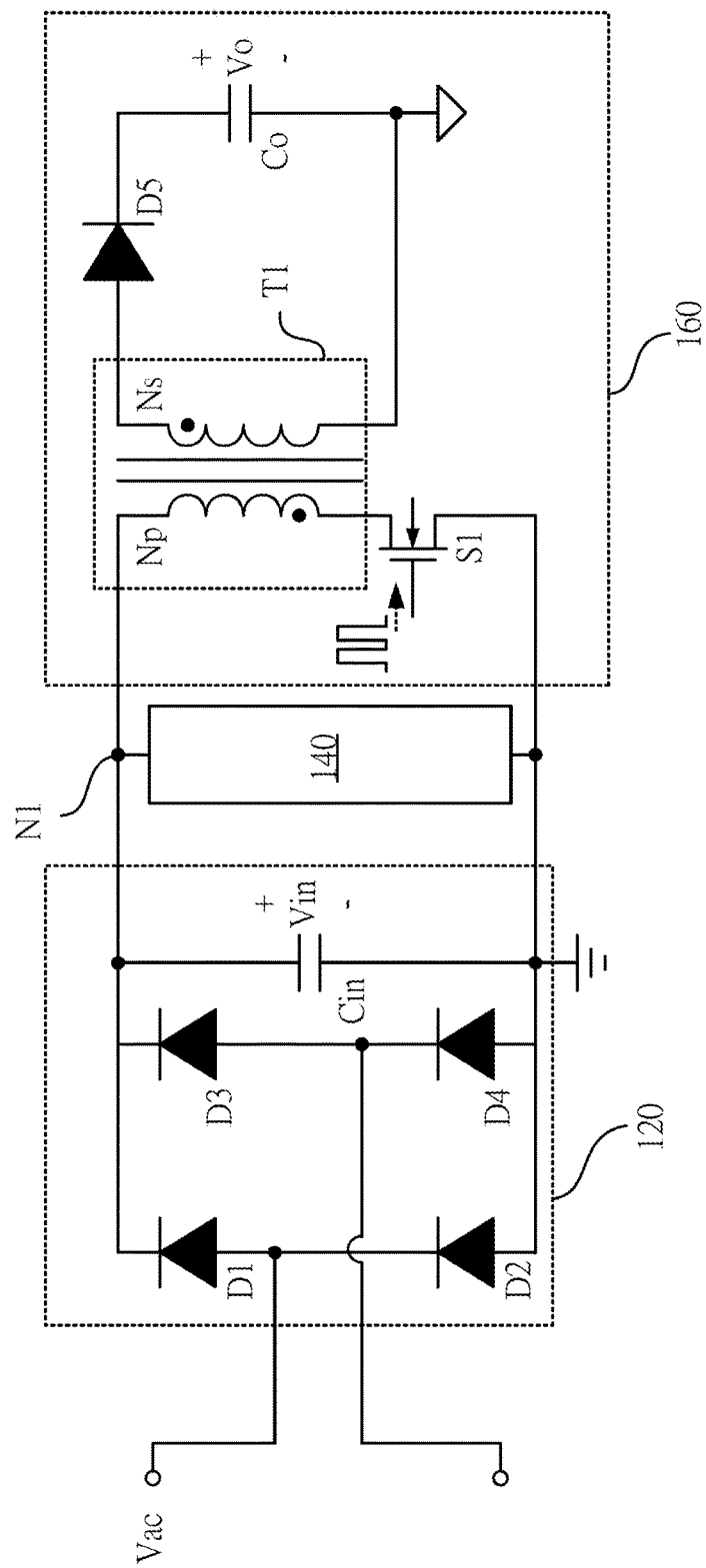
FIG. 1 is a diagram illustrating a power supply according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a power supply 100 according to some embodiments of the present disclosure. For example, in some embodiments, the power supply 100 may provide the electricity required by a light-emitting diode (LED) driver. As shown in FIG. 1, in some embodiments, the power supply 100 includes a rectifying circuit 120, a snubber circuit 140 and a power converting circuit 160. The power converting circuit 160 is electrically coupled to an output terminal of the rectifying circuit 120 at a node N1. The snubber circuit 140 is also electrically coupled to the rectifying circuit 120 and the power converting circuit 160 at the node N1.

As shown in FIG. 1, the rectifying circuit 120 is configured to convert an ac input voltage Vac to a dc voltage Vin. For example, in some embodiments, the rectifying circuit 120 may be a bridge rectifying circuit, and include a bridge formed by diodes D1, D2, D3, D4 and a filtering capacitor Cin. Specifically, the anode of the diode D1 is electrically coupled to a first input terminal of an ac input voltage Vac, and the cathode of the diode D1 is electrically coupled to a first terminal of the filtering capacitor Cin. The anode of the diode D2 is electrically coupled to a second terminal of the filtering capacitor Cin. The cathode of the diode D2 is electrically coupled to the anode of the diode D1. The anode of the diode D3 is electrically coupled to a second input terminal of the ac input voltage Vac, and the cathode of the diode D3 is electrically coupled to the first terminal of the filtering capacitor Cin. The anode of the diode D4 is electrically coupled to the second terminal of the filtering capacitor Cin. The cathode of the diode D4 is electrically coupled to the anode of the diode D3.

Accordingly, the rectifying circuit 120 may receive the ac input voltage Vac and perform rectification by the diodes D1, D2, D3, and D4, and perform filtering by the filtering capacitor Cin to the rectified voltage signal in order to output the dc voltage Vin.

In some embodiments, the power converting circuit 160 is configured to convert the dc voltage Vin to the dc voltage Vo. For example, the power converting circuit 160 may include a switching power converting structure, in which the power converting circuit 160 includes a switching element S1. The power converting circuit 160 is configured to turn on or turn off the switching element S1 selectively by a pulse width modulation (PWM) signal to convert the dc voltage Vin to the voltage signal Vo. Accordingly, by properly adjust the duty cycle of the pulse width modulation signal, the voltage level of the outputted dc voltage Vo may be adjusted. In various embodiments, the switching element S1 may be achieved by various transistor switches such as a Metal-Oxide-Semiconductor Field-Effect Transistor (MOSFET), a Bipolar Junction Transistor (BJT), etc., but the present disclosure is not limited thereto.

In the embodiment shown in FIG. 1, the power converting circuit 160 may include a Fly-back converter to convert the dc voltage Vin to the DC voltage Vo. Specifically. The power converting circuit 160 includes the switching element S1, a primary winding Np and a secondary winding Ns of the transformer T1, a diode D5 and an output capacitor Co.

A first terminal of the primary winding Np is electrically coupled to the node N1, and a second terminal of the primary winding Np is electrically coupled to the first terminal of the switching element S1. The second terminal of the switching element S1 is electrically coupled to the second terminal of the filtering capacitor Cin. The control terminal of the switching element S1 is configured to receive the pulse width modulation signal. The first terminal of the secondary winding Ns is electrically coupled to the anode of the diode D5. The cathode of the diode D5 is electrically coupled to the first terminal of the output capacitor Co. The second terminal of the secondary winding Ns is electrically coupled to the second terminal of the output capacitor Co.

On the condition that the switching element S1 is turned on, the primary current flowing through the primary winding Np and the electricity is stored on the primary winding Np. Since the polarities of the primary winding Np and the secondary winding Ns are opposite, the diode D5 is operated at the reversed bias region and does not conduct, and the output capacitor Co is configured to provide the electricity output required by the later stage circuit. On the condition that the switching element S1 is turned off, the primary current decreases to zero and the polarities on the windings is reversed such that the diode D5 conducts, and the energy stored in the transformer T1 is outputted via the diode D5 to the output capacitor Co and the later stage current.

It is noted that, the power converting circuit 160 in FIG. 1 is shown for exemplary purposes only and not meant to limit the present disclosure. The power converting circuit 160 may also be realized by other structures of fly-back power converter, or various forms of switching power converters.

During the booting of the power, or when an abnormal operation or lightning occurs, the surge current occurs in the system and results in a significant impact to the normal use of the power circuit. For example, when lightning occurs, the dc voltage Vin may rise rapidly and the energy of lightning may flow into the power converting circuit 160 and thus resulting the switching element S1 unable to operate normally, which cause an abnormal operation of the power converting circuit 160. In a more serious scenario, the electrical devices in the power converting circuit 160 may be damaged as a result.

To prevent the situation mentioned above, in some embodiments, on the condition that the dc voltage Vin is greater than the limiting level, the snubber circuit 140 is configured to absorb the electricity power to prevent the voltage across the switching element S1 in the power converting circuit 160 from exceeding a safety upper limit and damaging the switching element S1. Alternatively stated, in normal operation. The current does not flow through the snubber circuit 140. On the other hand, on the condition that the surge voltage and the surge current occurs such that the dc voltage Vin is greater than the limiting level, the snubber circuit 140 may form a discharging circuit to absorb the extra power. Thus, the energy flowing into the power converting circuit 160 may be reduced, and the damage to the power converting circuit 160 or to the later stage circuit caused by the surge voltage and the surge current is avoided.

Figure 2:
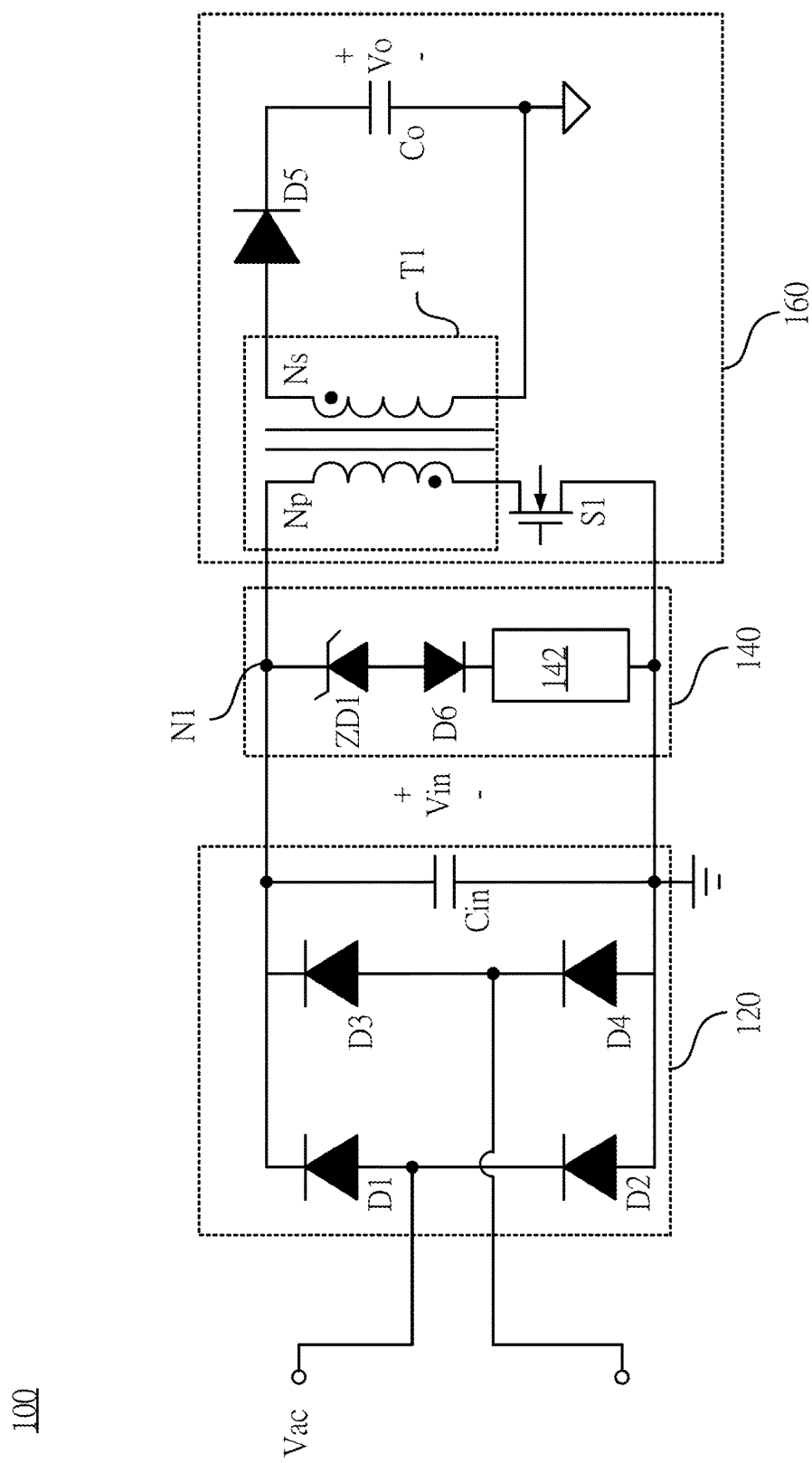
FIG. 2 is a diagram illustrating the power converter according to some embodiments of the present disclosure.

For further explanation of the operation of the snubber circuit 140, reference is made to FIG. 2. FIG. 2 is a diagram illustrating the power supply 100 according to some embodiments of the present disclosure. With respect to the embodiments of FIG. 1, like elements in FIG. 2 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 2.

As shown in FIG. 2, in some embodiments, the snubber circuit 140 includes a transient voltage suppressor (TVS) ZD1, a diode D6 and an energy storing unit 142. For example, the transient voltage suppressor ZD1 may be a unidirectional TVS diode. An anode of the transient voltage suppressor ZD1 is electrically coupled to an anode of the diode D6, and a cathode of the transient voltage suppressor ZD1 is electrically coupled to the node N1. The energy storing unit 142 is electrically coupled between a cathode of the diode D6 and a ground terminal of the primary side. Alternatively stated, the diode D6 is reversely coupled in series to the transient voltage suppressor ZD1.

On the condition that the dc voltage Vin is higher than the limiting level, the transient voltage suppressor ZD1 conducts correspondingly and clamps the voltage across two terminals of the transient voltage suppressor ZD1, and the diode D6 conducts in forward-bias. Specifically, on the condition that the dc voltage Vin is higher than the limiting level, the voltage across two terminals of the transient voltage suppressor ZD1 exceeds the breakdown voltage. At the time, the transient voltage suppressor ZD1 conducts as a clamper to clamp the voltage across two terminals to limit the voltage exceeding the breakdown voltage level. Accordingly, the current may flow into the energy storing unit 142 via the diode D6 conducting in forward-bias.

Therefore, the energy storing unit 142 may be configured to absorb the electricity power via the conducting transient voltage suppressor ZD1 and the diode D6 from the node N1.

In addition, since the diode D6 and the transient voltage suppressor ZD1 are reversely coupled in series, on the condition that the power supply operates in the normal state (i.e., the dc voltage Vin is not greater than the limiting level), the snubber circuit 140 is not activated due to the high resistance characteristic of the transient voltage suppressor ZD1 itself, and on the condition that the dc voltage Vin is higher than the limiting level, no reversed leakage current flowing into the power converting circuit 160 from the energy storing unit 142 since the diode D6 exists. Accordingly, it is guaranteed that the snubber circuit 140 does not affect the operation of the rectifying circuit 120 and the power converting circuit 160. Thus, the power supply 100 may maintain the original high power factor (PF) and low total harmonic distortion (THD).

Figure 3:
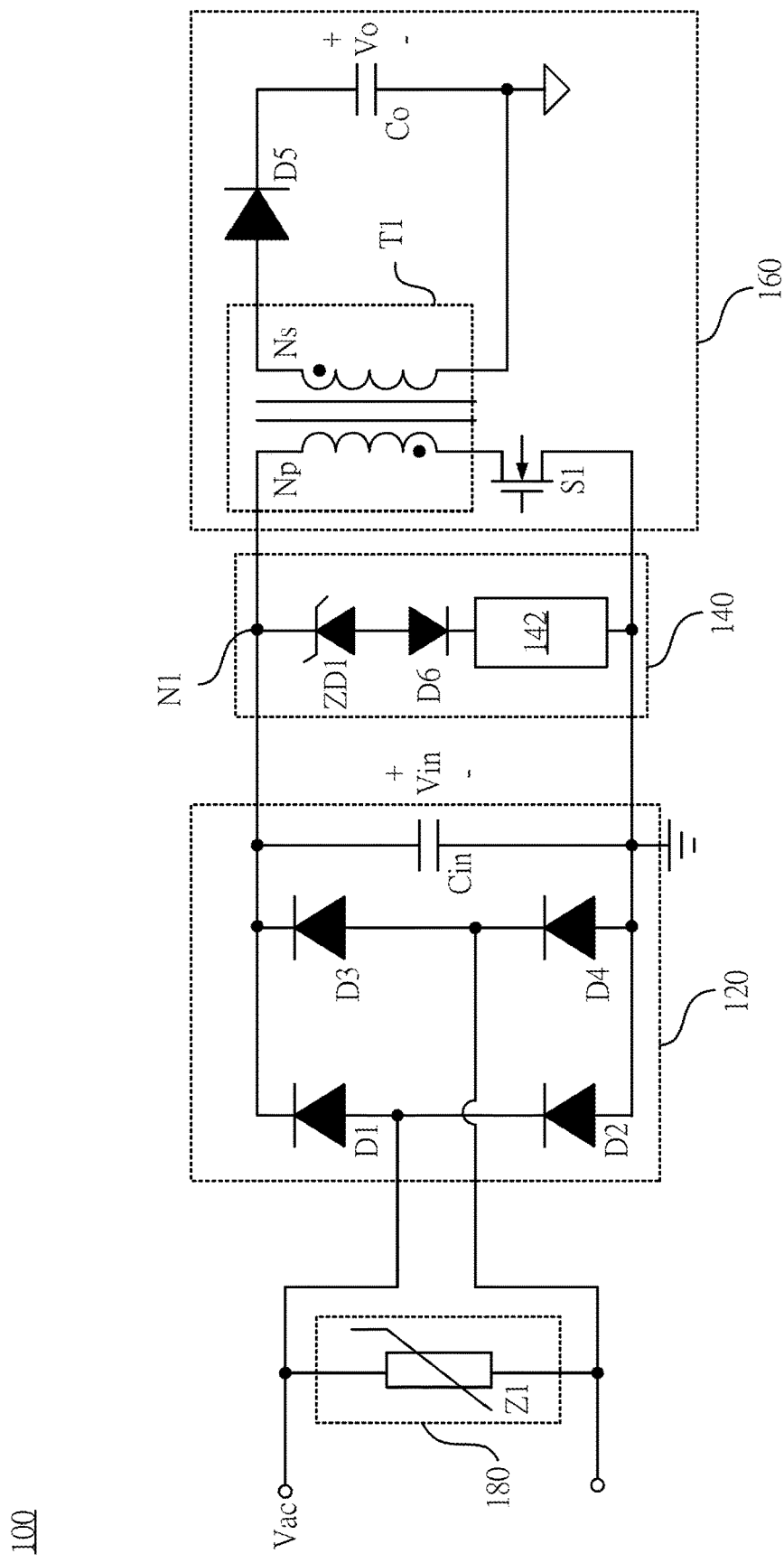
FIG. 3 is a diagram illustrating the power supply according to some embodiments of the present disclosure.

Reference is made to FIG. 3. FIG. 3 is a diagram illustrating the power supply 100 according to some embodiments of the present disclosure. With respect to the embodiments of FIG. 1 and FIG. 2, like elements in FIG. 3 are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 2 and FIG. 3.

Compared to the embodiments shown in FIG. 2, in some embodiments, the power supply 100 further includes a clamping circuit 180. The clamping circuit 180 is electrically coupled to the rectifying circuit 120.

Specifically, in the embodiments shown in FIG. 3, the clamping circuit 180 is coupled across two terminals of the ac input voltage Vac and is configured to clamp the ac input voltage Vac at a clamping voltage on the condition that a surge voltage occurs. For example, the clamping circuit 180 may include a varistor Z1. The resistance value of the varistor Z1 varies as the voltage across two terminals varies. Under the normal operating voltage, the varistor Z1 has a high resistance value. On the other hand, on the condition that the surge voltage occurs, the resistance value of the varistor Z1 decreases and thus the varistor Z1 conducts. Accordingly, a discharging current flows through the varistor Z1 to clamp the ac input voltage Vac at the clamping voltage. Thus, by the co-operation of the clamping circuit 180 and the snubber circuit 140, the over-voltage is prevented from flowing into the power converting circuit 160.

For example, in some embodiments, considering the rated input and output voltage required by the power supply 100, the varistor Z1 may choose a varistor having the ac rated voltage 350 VAC. The maximum clamping voltage is about 925V for the above-mentioned varistor Z1. Thus, on the condition that the surge voltage occurs, the power supply 100 may guarantee that the voltage level of the dc voltage Vin does not exceed 925V.

On the other hand, the TVS diode with the break down voltage at about 400V may be chosen for the transient voltage suppressor ZD1. Thus, the voltage across two terminals of the energy storing unit 142 does not exceed about 525V. Therefore, the withstand voltage value required by the electrical devices in the energy storing unit 142 may be reduced.

Figure 4:
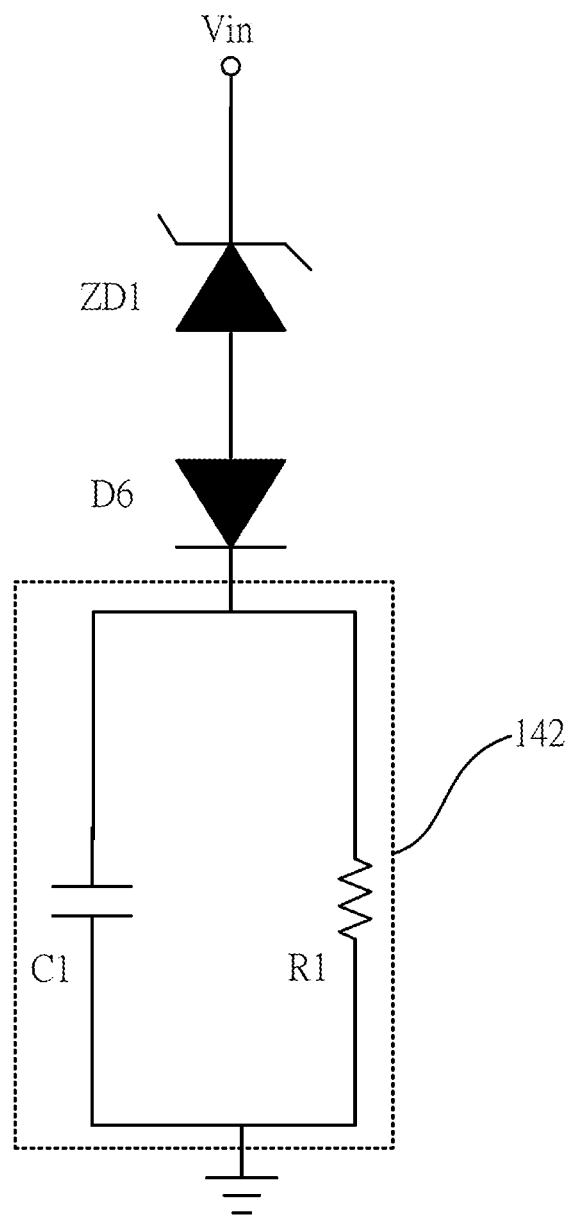
FIG. 4 is a diagram illustrating the snubber circuit according to some embodiments of the present disclosure.

Reference is made to FIG. 4. FIG. 4 is a diagram illustrating the snubber circuit 140 according to some embodiments of the present disclosure. As shown in FIG. 4, in some embodiments, the energy storing unit 142 in the snubber circuit 140 includes a capacitor unit C1 and a resistor unit R1. The capacitor unit C1 is electrically coupled between the cathode of the diode D6 and a ground terminal, and is configured to absorb the electricity power. The resistor unit R1 is electrically coupled to the capacitor unit C1 in parallel and configured to form a discharging route with the capacitor unit C1 to discharge the electricity power absorbed by the capacitor unit C1.

Thus, after the clamping of the clamping circuit 180 and the transient voltage suppressor ZD1, the remaining lightning energy may be absorbed by the capacitor unit C1 which is coupled in series to the transient voltage suppressor ZD1. Alternatively stated, on the condition that the dc voltage Vin is higher than the limiting level, the capacitor unit C1 is configured to absorb the electricity power via the conducting transient voltage suppressor ZD1 and the diode D6. Then, the residual voltage on the capacitor unit C1 may be discharged by the RC circuit formed by the capacitor unit C1 and the resistor unit R1. That is to say, the resistor unit R1 forms the discharging route with the capacitor unit C1 to discharge the electricity power absorbed by the capacitor unit C1 in order to prevent the voltage of the capacitor C1 saturates. Thus, the energy storing unit 142 may consume the residual lightning energy by the capacitor unit C1 and the resistor unit R1 couple to each other in parallel, to achieve the lightning protection and the surge voltage/surge current protection.

Figure 5:
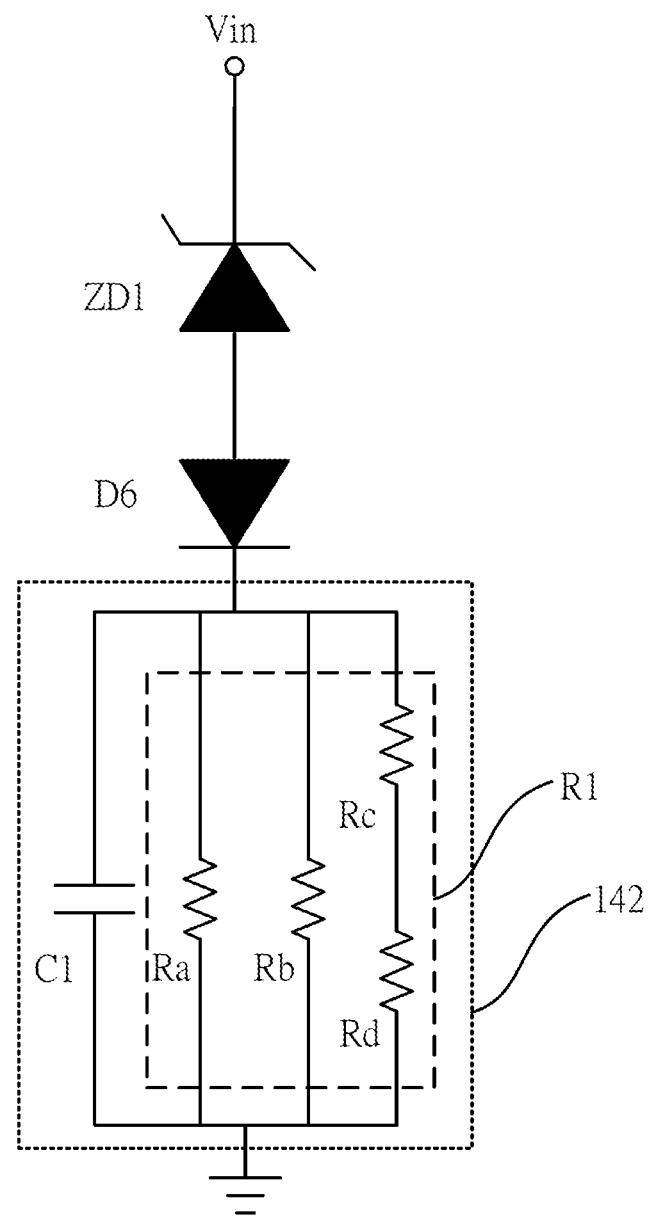
FIG. 5 is a diagram illustrating the snubber circuit according to some other embodiments of the present disclosure.

It is noted that, in some embodiments, the capacitor unit C1 and the resistor unit R1 may respectively include a plurality of capacitors and resistors coupled in series or in parallel. Reference is made to FIG. 5. FIG. 5 is a diagram illustrating the snubber circuit 140 according to some other embodiments of the present disclosure. As shown in FIG. 5, in some embodiments, the resistor unit R1 may include multiple resistors Ra-Rd electrically coupled to each other. For example, the resistors Rc and Rd may be coupled in series and then coupled to the resistors Ra, Rb and the capacitor units C1 in parallel.

Thus, the energy storing unit 142 may be implemented by choosing proper capacitors and resistors according to the actual needs of the circuit layout and the circuit design and the cost consideration. Alternatively stated, the energy storing unit 142 illustrated in various embodiments of the present disclosure is merely an example of the present disclosure and not meant to limit the present disclosure.

In summary, in various embodiments of the present disclosure, by arranging the snubber circuit after the rectifying circuit, the power supply is guaranteed to keep at high PF and low THD, and the extra electricity may be absorbed by the snubber circuit when lightning or other surge voltage occurs, in order to prevent the power flowing into the power converting circuit, causing the malfunction of the circuit or damage to the elements.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply comprising:
a rectifying circuit configured to convert an ac input voltage to a first dc voltage;
a power converting circuit electrically coupled to the rectifying circuit at a node, wherein the power converting circuit comprises a switching element and is configured to convert the first dc voltage to a second dc voltage by selectively turning on or off the switching element; and
a snubber circuit electrically coupled to the rectifying circuit and the power converting circuit at the node, wherein on the condition that the first dc voltage is higher than a limiting level, the snubber circuit is configured to absorb the electricity power to prevent the voltage across the switching element from exceeding a safety upper limit,
wherein the snubber circuit comprises a transient voltage suppressor and a first diode, an anode of the transient voltage suppressor is electrically coupled to an anode of the first diode, and a cathode of the transient voltage suppressor is electrically coupled to the node,
wherein on the condition that the first dc voltage is higher than the limiting level, the transient voltage suppressor conducts correspondingly and clamps the voltage across two terminals of the transient voltage suppressor, then the first diode conducts in forward-bias.

2. The power supply of claim 1, wherein the snubber circuit further comprises an energy storing unit, and the energy storing unit is electrically coupled to a cathode of the first diode and configured to absorb the electricity power via the conducting transient voltage suppressor and the first diode from the node.

3. The power supply of claim 2, wherein the energy storing unit comprises:
a capacitor unit electrically coupled between the cathode of the first diode and a ground terminal and configured to absorb the electricity power; and
a resistor unit electrically coupled to the capacitor unit in parallel and configured to form a discharging route with the capacitor unit to discharge the electricity power.

4. The power supply of claim 3, wherein the resistor unit comprises a plurality of resistors electrically coupled to each other.

5. The power supply of claim 1, wherein the power converting circuit comprises a fly-back converter configured to convert the first dc voltage to the second dc voltage.

6. The power supply of claim 1, further comprising a clamping circuit electrically coupled to the rectifying circuit configured to clamp the ac input voltage at a clamping voltage on the condition that a surge voltage occurs.

7. The power supply of claim 6, wherein the clamping circuit comprises a varistor, and on the condition that the surge voltage occurs, a discharging current flows through the varistor to clamp the ac input voltage at the clamping voltage.

8. A power supply comprising:
a rectifying circuit configured to convert an ac input voltage to a first dc voltage;
a power converting circuit electrically coupled to the rectifying circuit at a node and configured to convert the first dc voltage to a second dc voltage;
a transient voltage suppressor, wherein a cathode of the transient voltage suppressor is electrically coupled to the node;
a first diode, wherein an anode of the first diode is electrically coupled to an anode of the transient voltage suppressor;
a capacitor unit electrically coupled between a cathode of the first diode and a ground terminal; and
a resistor unit electrically coupled to the capacitor unit in parallel,
wherein on the condition that the first dc voltage is higher than a limiting level, the transient voltage suppressor conducts correspondingly and clamps the voltage across two terminals of the transient voltage suppressor, then the first diode conducts in forward-bias.

9. The power supply of claim 8, wherein on the condition that the first dc voltage is higher than a limiting level, the capacitor unit is configured to absorb the electricity power via the conducting transient voltage suppressor and the first diode.

10. The power supply of claim 9, wherein the resistor unit is configured to form a discharging route with the capacitor unit to discharge the electricity power absorbed by the capacitor unit.

11. The power supply of claim 8, further comprising a clamping circuit electrically coupled to the rectifying circuit configured to clamp the ac input voltage at a clamping voltage on the condition that a surge voltage occurs.

12. The power supply of claim 11, wherein the clamping circuit comprises a varistor, and on the condition that the surge voltage occurs, a discharging current flows through the varistor to clamp the ac input voltage at the clamping voltage.

* * * * *